May 20, 1958  E. H. WILLETTS  2,835,502
CARGO TRAILER WITH ADJUSTABLE FLOOR LEVEL
Filed June 15, 1954  2 Sheets-Sheet 1
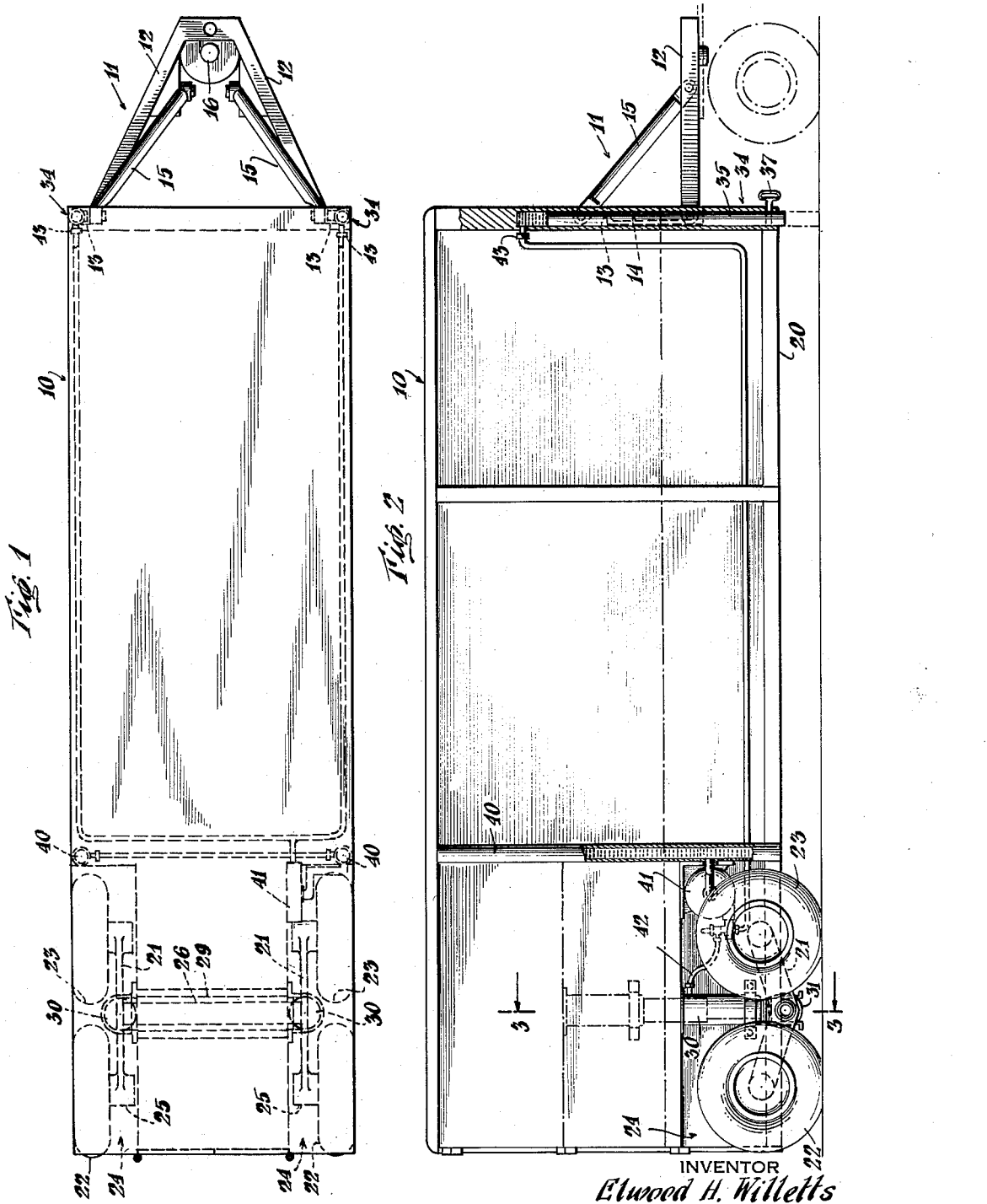
INVENTOR
*Elwood H. Willetts*
BY
*Kane, Dalsimer and Kane*
ATTORNEYS May 20, 1958
E. H. WILLETTS
2,835,502
CARGO TRAILER WITH ADJUSTABLE FLOOR LEVEL
Filed June 15, 1954
2 Sheets-Sheet 2
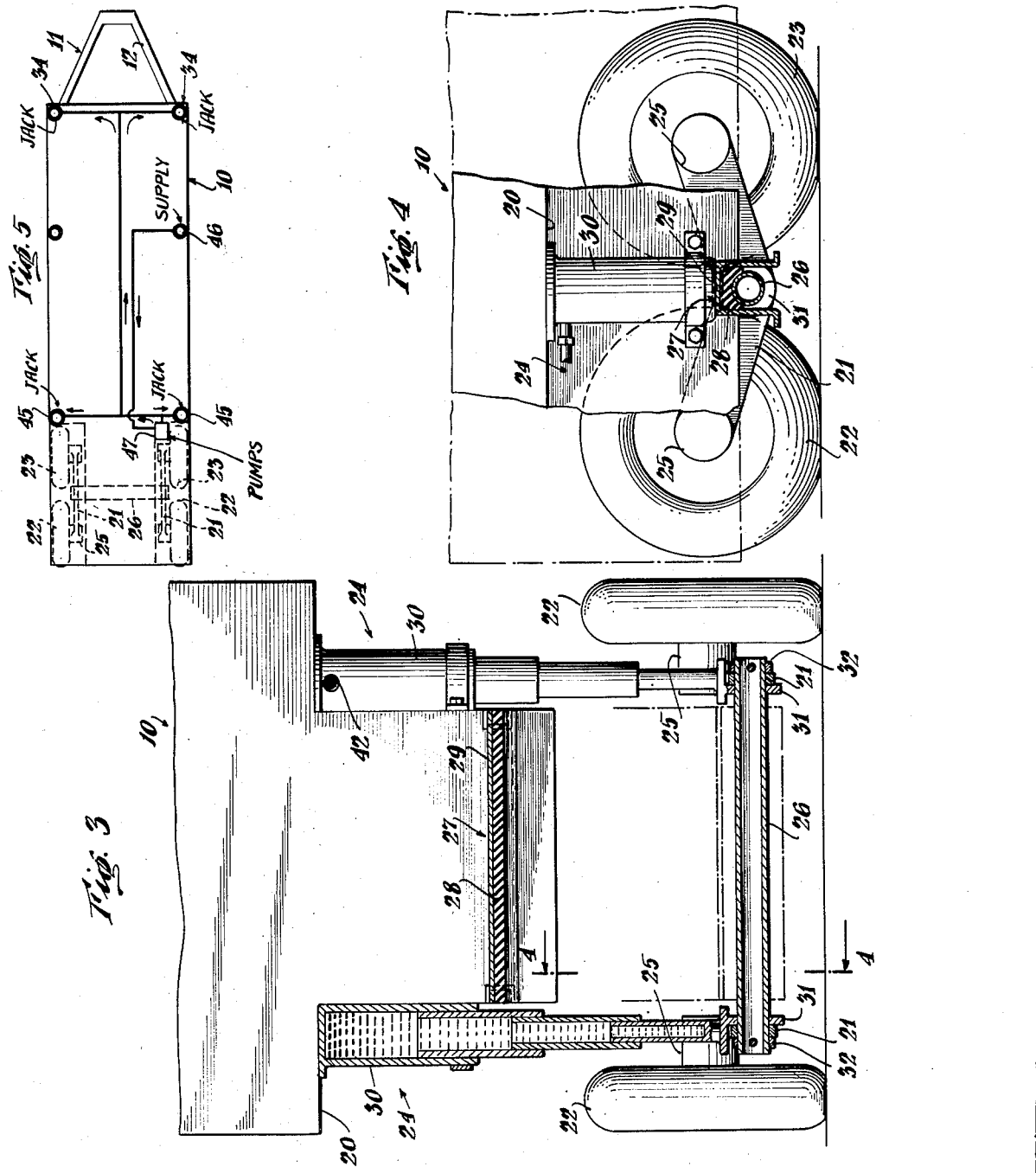
INVENTOR
Elwood H. Willetts
BY
Kane, Dalsimer and Kane
ATTORNEYS United States Patent Office 2,835,502
Patented May 20, 1958

2,835,502
CARGO TRAILER WITH ADJUSTABLE FLOOR LEVEL

Elwood H. Willetts, Douglaston, N. Y.

Application June 15, 1954, Serial No. 436,856

1 Claim. (Cl. 280—44)

This invention relates to an improved cargo vehicle of the semi-trailer type for coordinated rail, ship and highway transport in which the floor level of the vehicle is lower than the fifth wheel of its highway truck tractor so as to provide maximum practical cubic capacity for cargo, per foot of vehicle length.

In order to facilitate the loading and unloading of cargo vehicles, such as conventional highway semi-trailers, an attempt has been made to standardize the height of the trailer floors and of the loading platforms. Thus, the conventional highway semi-trailer has a floor height of approximately 5' and many loading platforms have the same height. However, the problem is complicated by the fact that many platforms are of lesser height and to meet this situation a device known as an elevating tail gate is frequently used to equalize the respective heights so power trucks may be rolled between the vehicle floor and the platform. Much time is consumed by the fact that such a tail gate must be separately actuated for each individual hand or power truck load.

Additional problems are presented by a cargo vehicle such as a semi-trailer used for coordinated rail and highway transport. Vehicles of this type are loaded at the factory, mill or other source of supply of the cargo and are hauled over the road to the nearest railroad freight depot or pier. The vehicle is then placed on the platform or deck of a railway car or ship and is transported in this fashion to a destination railhead or pier convenient to the point of delivery. Once again the cargo vehicle is transported over the highway to the point of delivery. In order to make efficient use of the cubic space available on the deck of a railway car or boat I have found it desirable to make the floor of the cargo vehicle as low as possible. The result is that the platform of such a cargo vehicle designed for coordinated rail, ship and highway transport does not correspond in height with most existing loading platforms and the loading and unloading problem is accordingly accentuated.

It is an object of the present invention to overcome the difficulties heretofore encountered and to provide an improved cargo vehicle, particularly a cargo vehicle of the semi-trailer type designed for coordinated rail, or ship, and highway transport, having a low floor positioned at a level beneath the kingpin frame and preferably below the wheel spindles so as to more nearly meet the level of sidewalk or low platforms, yet adjustable upward to the varying heights of other and higher platforms.

A further object is the provision of an improved cargo vehicle of the above type which is designed to increase utilization of flatcar or ship deck space and at the same time is so arranged that its floor level can be readily accommodated to differing platform heights.

In carrying out my invention I contemplate providing the vehicle with an improved jack assembly whereby the level of the floor and structure thereover may be readily adjusted and controlled so as to correspond with the platform level at which the vehicle is to be loaded or unloaded, and while it is detached from its truck tractor.

The design and arrangement of my improved cargo vehicle and jack assembly is more fully described in the accompanying drawings in which—

Fig. 1 is a plan view of a cargo vehicle in the form of a semi-trailer embodying my invention;

Fig. 2 is a side elevational view of the vehicle;

Fig. 3 is a detailed view showing the jack assembly at the rear of the vehicle in elevated position;

Fig. 4 is a detailed view in side elevation of the wheel and jack assembly at the rear of the vehicle showing the jack in lowered position; and Fig. 5 is a partially diagrammatic plan view of a cargo vehicle showing a modified arrangement of jacks.

Referring now to the first form of my invention shown in Figs. 1 through 4, I have illustrated my invention as embodied in a cargo vehicle in the form of a semi-trailer.

The semi-trailer is of the type indicated above and is designed for coordinated rail, or ship and highway transport and, aside from my improvements and invention described herein, may be generally similar to the trailers shown in my prior Patents Nos. 2,038,975; 2,503,368 and 2,525,388. Thus, the vehicle is shown as provided with a body 10 of the desired size and required strength and with a folding kingpin frame 11 at the leading end thereof which may take the form of beams 12 connected together at their forward end and supported at their trailing ends for sliding motion in a vertical direction in the slots 14 provided in the bracket 13. Struts 15 are pivotally connected at their opposite ends to the vehicle frame and to the kingpin support. A kingpin is provided at 16 for engagement in the conventional manner with the fifth wheel of a tractor so that the trailer may be towed over the highway. The kingpin frame may be shifted between the normal operating position shown in Figs. 1 and 2 to an inoperative position extending vertically downwardly at the front of the vehicle. This may be accomplished by shifting the inner ends of the beams upwardly in the slots 14 and pivoting the struts 15 downwardly, as shown in my United States Patent No. 2,038,975.

In order to make efficient use of the deck or platform of car or ship on which the vehicle is linehauled and in order to provide a maximum amount of space in the vehicle for the cargo to be carried therein, the floor 20 of the vehicle is positioned substantially below the level of the floor of conventional semi-trailers. Thus, it is positioned beneath the kingpin frame when the kingpin frame is in its operative position and it also is preferably positioned beneath the level of the wheel spindles, as shown. Conventional access doors are provided at the rear of the vehicle so that the trailing end of the vehicle may be opened to give access to the interior down to the floor level of the vehicle. In this way, hand and power trucks used in loading and unloading the vehicle may be rolled directly onto the floor of the vehicle from a low loading platform or sidewalk, to afford the same facility as now provided only through use of an elevating tail gate.

The loaded weight of a cargo vehicle of this type may be such that it requires more than one axle to support the trailing end thereof. If two axles were provided to extend across the width of the vehicle, the floor of the vehicle would normally have to be placed at such a level as to provide clearance for the vertical movements of the support axles resulting from the uneven surface of the highway over which the vehicle travels. To overcome this problem, I have provided an improved tandem wheel assembly for the trailing end of the vehicle whereby the floor can be maintained at a low level, below that of the wheel spindles, while at the same time the wheels can readily accommodate themselves to uneven highway surfaces.

My improved wheel mounting takes the form of a walking beam or rocker arm 21 provided on each side of the vehicle and each serving to support a plurality of wheels 22 and 23 adjacent the opposite ends thereof. While I have shown in the drawings an arrangement in which single wheels are arranged in tandem relationship, it should be understood that my invention also contemplates the use of modified arrangements for multiple wheels as, for instance, dual wheels are in tandem relationship. Where dual wheels are employed, they are arranged at opposite sides of a centrally positioned walking beam adjacent both ends thereof. Dual wheels permit the use of smaller wheels and tires resulting in a reduction in weight and cost and also affording braking areas on each side of the vehicle.

A well 24 is provided on each side of the vehicle to accommodate the wheel assembly as shown. Each walking beam is in the form of an upwardly facing obtuse angle having a boss 25 at each end supporting the wheel spindle. At their central points the walking beams are supported for independent rocking motion on trunnions formed at opposite ends of the rigid supporting member or shaft 26, which in turn rests in the support 27 extending transversely of the undersurface of the vehicle. Support 27 preferably takes the form of a resilient seat 28 made of rubber, synthetic rubber or the like and shaped to accommodate the external contour of the shaft 26 and mounted in the channel member 29. The support 27 is preferably so arranged as not to extend above the interior level of the floor 20.

When the vehicle travels over the ground each walking beam may oscillate independently with respect to the other on shaft 26 to permit the tandem wheels on the two sides of the vehicle to accommodate themselves to any uneven surface. As shown, the floor level may be maintained below the level of the wheel spindles.

As previously pointed out, most loading platforms are higher than the floor 20 and my invention contemplates the provision of a plurality of jacks whereby the body may be elevated so that the floor is brought substantially to the level of the loading platform. The form of jack employed may of course be varied. However, the jacks are preferably power actuated and are in positive relationship to each other, so as to maintain parallelism between the floor and the surface on which the vehicle is parked. The time-volume displacement of the individual hydraulic pump connected to each jack, insures positive uniformity of elevation of body—regardless of cargo load distribution therewithin.

My improved wheel assembly, as described above, lends itself readily to an arrangement whereby the jacks serve to elevate the body of the vehicle with respect to the wheel assembly. Thus, as shown in Figs. 1 to 4 inclusive, I may provide hydraulic jacks 30 in the well on each side of the vehicle arranged so as to engage the vehicle body at its upper end and the wheel supporting assembly at its lower end. The form of attachment to the wheel assembly may vary. One form is shown in Figs. 1–4 in which a lug 31 at the lower end of the jacks engages the transverse shaft 26. A collar 32 may serve to hold the walking beam in place on the transverse shaft while permitting oscillating movement thereof.

So that the wells 24 may be kept to a minimum size the jacks 30 are preferably of the telescoping type as shown. When the jacks are in their lowermost position the vehicle body, wheel assembly and jacks assume the position shown in full line in Fig. 2 and also in Fig. 4. When the jacks are in their fully elevated position the respective parts will assume the positions indicated in dotted lines in Fig. 2 and in full line in Fig. 3. The vehicle body may be fully elevated to the position shown in these figures or may be elevated to any intermediate position between the lowermost and fully elevated positions.

Suitable jacks 34 are also provided at the leading end of the trailer. The jacks 34 may be of any desired type such as the hydraulic ram jacks indicated most clearly in Fig. 2. The illustrated jacks each consist of a hydraulic ram 35 and cylinder located in the tubular frame member which serves as a housing. The ram may be held in its fully elevated position by means of a removable pin 37 which engages with registering apertures in the frame and ram. Also, before the kingpin frame has been disengaged from the fifth wheel of a trailer an extension of the ram 35 may be dropped to the ground to the position indicated in dotted lines in Fig. 2 and the pin 37 inserted in another aperture to hold the ram in that position.

When the floor level of the vehicle is elevated to the level of a loading platform the hydraulic jacks 34 at the leading end of the vehicle are operated simultaneously with the jacks 30 at the trailing end so that the floor level is elevated uniformly and in parallelism with the ground surface.

The jacks may be operated either manually or by power. Where power is employed, the power may be supplied by a separate unit or by the tractor or it may be embodied in the semi-trailer so the floor height may be adjusted to that of any platform (within range of 18–60") independently of an outside power source. One convenient form is shown in the drawings wherein the tubular supports or uprights 40 of the vehicle body serve as hydraulic reservoirs which supply the hydraulic pump 41 which is connected in suitable fashion by the hydraulic tubes 42 to each of the hydraulic cylinders. The hydraulic pump is also connected to the fittings for the ram jacks at the forward end of the vehicle indicated at 43. Suitable balancing valves may be provided in the line to insure coordinated operation of the jacks so as to cause the floor level to be elevated uniformly. In the first form of my invention, it will be appreciated that the jacks 34 engage directly with the ground and the jacks 30 engage the support for the wheel assembly. Thus, when the jacks are operated, the body 10 shifts vertically relative to the wheel assembly.

As previously indicated, the arrangement of the jacks may of course be varied. As an example, the jacks at the trailing end of the vehicle may engage directly with the ground instead of engaging with the shaft or supporting member 26. Such an arrangement is diagrammatically indicated in Fig. 5. Thus, Fig. 5 indicates a semi-trailer having a body 10, kingpin frame 11 at the leading end thereof and wheel assemblies similar to the first form of my invention at the trailing end thereof. The jacks 34 at the forward end of the vehicle are also similar to those shown in the first form of my invention. The jacks at the trailing end are similar to jacks 34 and are indicated at 45 as being mounted in the body of the vehicle immediately forward of the wheel wells. These jacks are of the single stage ram type and may be provided in the tubular frame members of the body in the same manner as the jacks at the leading end of the vehicle. The hydraulic fluid from the supply 46 is pumped by pump 47 through the indicated pipelines to the cylinders of jacks 34 and 45. Balancing valves may be provided to insure uniform elevation of all portions of the floor. It will thus be seen that in this form of my invention all of the jacks engage directly with the ground. The specific location of the jacks may be varied and if desired one or more jacks may be mounted on the kingpin frame to engage either with the ground or with the tractor.

In using my improved cargo vehicle the vehicle is first towed by tractor to the loading platform. After the tractor is disengaged, the vehicle is elevated so that the floor level thereof is substantially the same as the loading platform thereby permitting hand and power trucks to be rolled from the loading platform onto the floor of the trailer. After it has been loaded, the jacks are lowered and the trailer can be towed over the highway to a railway depot or ship pier where the trailer is transferred to the deck or platform of a train or ship and transported to another pier or depot convenient to the consignee. From destination railhead or pier the trailer is then towed over the highway to the point of delivery, and after disengagement from the tractor it is elevated to the platform level and unloaded.

The arrangement of the floor level below the kingpin frame and below the wheel spindles provides a maximum amount of cargo space per foot of deck length occupied in linehaul transit. Due to the novel and improved wheel assembly at the trailing end of the vehicle, a single floor level of low height may be maintained in the vehicle from front to back. At the same time, a multiple spindle or tandem wheel support is provided which accommodates itself to uneven highway surfaces and highway weight limit laws.

Modifications may, of course, be made in the illustrated and described embodiments of my invention without departing from the invention as set forth in the accompanying claim.

I claim:

A cargo vehicle of the semi-trailer type cooperative to be drawn by a towing vehicle comprising a vehicle body structure, a king pin assembly operatively connected to the forward end of the body structure and cooperable to releasably engage a towing vehicle whereby the cargo vehicle may be towed, a floor deck forming part of the body structure and extending rearwardly from the king pin assembly, a downwardly facing channel member disposed transversely of the floor deck adjacent the trailing end of the vehicle, a resilient cushion disposed in the channel member, a wheel assembly adjacent the trailing end of the vehicle body structure, said assembly including a rigid supporting member extending transversely of the vehicle body structure and adapted to rest in the channel member in engagement with the resilient cushion, wheels rotatably supported by said rigid supporting member at opposite sides of the vehicle body structure, a hydraulic mechanism for uniformly raising and lowering the floor deck relative to the ground when the king pin assembly is disconnected from the towing vehicle, said mechanism comprising hydraulic jack means having rams for operatively engaging the ground, mounted at the forward end of the vehicle body structure and hydraulic jack means adjacent the trailing end of the vehicle body structure between such structure and the rigid supporting member.

References Cited in the file of this patent

UNITED STATES PATENTS

| | | |
|---|---|---|
| 1,343,682 | Richmond | June 15, 1920 |
| 1,925,536 | Judd | Sept. 5, 1933 |
| 2,038,975 | Willetts | Apr. 28, 1936 |
| 2,475,443 | Bill | July 5, 1949 |
| 2,586,218 | Gazda | Feb. 19, 1952 |
| 2,635,897 | Kendall | Apr. 21, 1953 |
| 2,636,746 | Meldrum | Apr. 28, 1953 |

FOREIGN PATENTS

| | | |
|---|---|---|
| 943,822 | France | Oct. 11, 1948 |
| 467,181 | Germany | Oct. 22, 1928 |